(12) United States Patent
Taherzadeh Boroujeni et al.

(10) Patent No.: US 11,700,643 B2
(45) Date of Patent: Jul. 11, 2023

(54) TECHNIQUES FOR TRANSMITTING REPETITIONS OF RANDOM ACCESS MESSAGES IN WIRELESS COMMUNICATIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US); Jelena Damnjanovic, Del Mar, CA (US); Yan Zhou, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/144,928

(22) Filed: Jan. 8, 2021

(65) Prior Publication Data
US 2021/0266972 A1    Aug. 26, 2021

Related U.S. Application Data

(60) Provisional application No. 62/979,936, filed on Feb. 21, 2020.

(51) Int. Cl.
*H04W 74/08* (2009.01)
(52) U.S. Cl.
CPC .............................. *H04W 74/0833* (2013.01)

(58) Field of Classification Search
CPC ................................................ H04W 74/0833
See application file for complete search history.

(56) References Cited

U.S. PATENT DOCUMENTS

| | | | |
|---|---|---|---|
| 2011/0149945 A1* | 6/2011 | Nakao | H04W 72/20 370/344 |
| 2015/0282215 A1 | 10/2015 | Eriksson et al. | |
| 2016/0302234 A1* | 10/2016 | Martinez Tarradell | H04L 1/08 |
| 2017/0251460 A1* | 8/2017 | Agiwal | H04B 7/0617 |
| 2020/0015258 A1* | 1/2020 | Zhou | H04W 72/23 |
| 2020/0213040 A1* | 7/2020 | Takeda | H04W 74/0833 |

(Continued)

FOREIGN PATENT DOCUMENTS

| | | | | |
|---|---|---|---|---|
| CN | 109600211 A | * | 4/2019 | |
| WO | WO-2015042866 A1 | * | 4/2015 | ............. H04W 4/70 |

(Continued)

OTHER PUBLICATIONS

International Search Report and Written Opinion—PCT/US2021/012946—ISA/EPO—dated May 10, 2021.

*Primary Examiner* — Harry H Kim
*Assistant Examiner* — Chuong M Nguyen
(74) *Attorney, Agent, or Firm* — ArentFox Schiff LLP

(57) ABSTRACT

Aspects described herein relate to communicating a first random access message in a two-step random access procedure, where the first random access message includes an indication to receive one or more repetitions of a second random access message from the base station, and communicating, based on the indication, an initial transmission of the second random access message and the one or more repetitions of the second random access message.

28 Claims, 8 Drawing Sheets

(56) References Cited

U.S. PATENT DOCUMENTS

| | | | | |
|---|---|---|---|---|
| 2020/0260485 A1* | 8/2020 | Lei | ................. | H04W 76/27 |
| 2020/0396744 A1* | 12/2020 | Xiong | ................. | H04L 5/0051 |
| 2021/0058971 A1* | 2/2021 | MolavianJazi | ....... | H04W 72/23 |

FOREIGN PATENT DOCUMENTS

| | | | | |
|---|---|---|---|---|
| WO | 2016045715 A1 | 3/2016 | | |
| WO | WO-2016045715 A1 * | 3/2016 | ........ | H04W 72/1289 |

* cited by examiner

TECHNIQUES FOR TRANSMITTING REPETITIONS OF RANDOM ACCESS MESSAGES IN WIRELESS COMMUNICATIONS

CLAIM OF PRIORITY UNDER 35 U.S.C. § 119

The present Application for Patent claims priority to Provisional Patent Application No. 62/979,936, entitled "TECHNIQUES FOR TRANSMITTING REPETITIONS OF RANDOM ACCESS MESSAGES IN WIRELESS COMMUNICATIONS" filed Feb. 21, 2020, which is assigned to the assignee hereof and hereby expressly incorporated by reference herein for all purposes.

BACKGROUND

Aspects of the present disclosure relate generally to wireless communication systems, and more particularly, to random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and contention resolution information. The first message can include two separate transmissions (e.g., in time) of the preamble and payload portions of the message, and the gap between the preamble transmission and the payload transmission can be configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes transmitting, to a base station, a first random access message in a two-step random access procedure, wherein the first random access message includes an indication to receive one or more repetitions of a second random access message from the base station, and receiving, from the base station and based on the indication, an initial transmission of the second random access message and the one or more repetitions of the second random access message.

In another example, a method for wireless communication is provided. The method includes receiving, from a device, a first random access message in a two-step random access procedure, wherein the first random access message includes an indication to receive one or more repetitions of a second random access message, and transmitting, to the device and based on the indication, an initial transmission of the second random access message and the one or more repetitions of the second random access message.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the memory and the transceiver. The one or more processors are configured to transmit, to a base station, a first random access message in a two-step random access procedure, wherein the first random access message includes an indication to receive one or more repetitions of a second random access message from the base station, and receive, from the base station and based on the indication, an initial transmission of the second random access message and the one or more repetitions of the second random access message.

In another example, an apparatus for wireless communication is provided that includes a transceiver, a memory configured to store instructions, and one or more processors communicatively coupled with the memory and the transceiver. The one or more processors are configured to receive, from a device, a first random access message in a two-step random access procedure, wherein the first random access message includes an indication to receive one or more repetitions of a second random access message, and transmit, to the device and based on the indication, an initial transmission of the second random access message and the one or more repetitions of the second random access message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
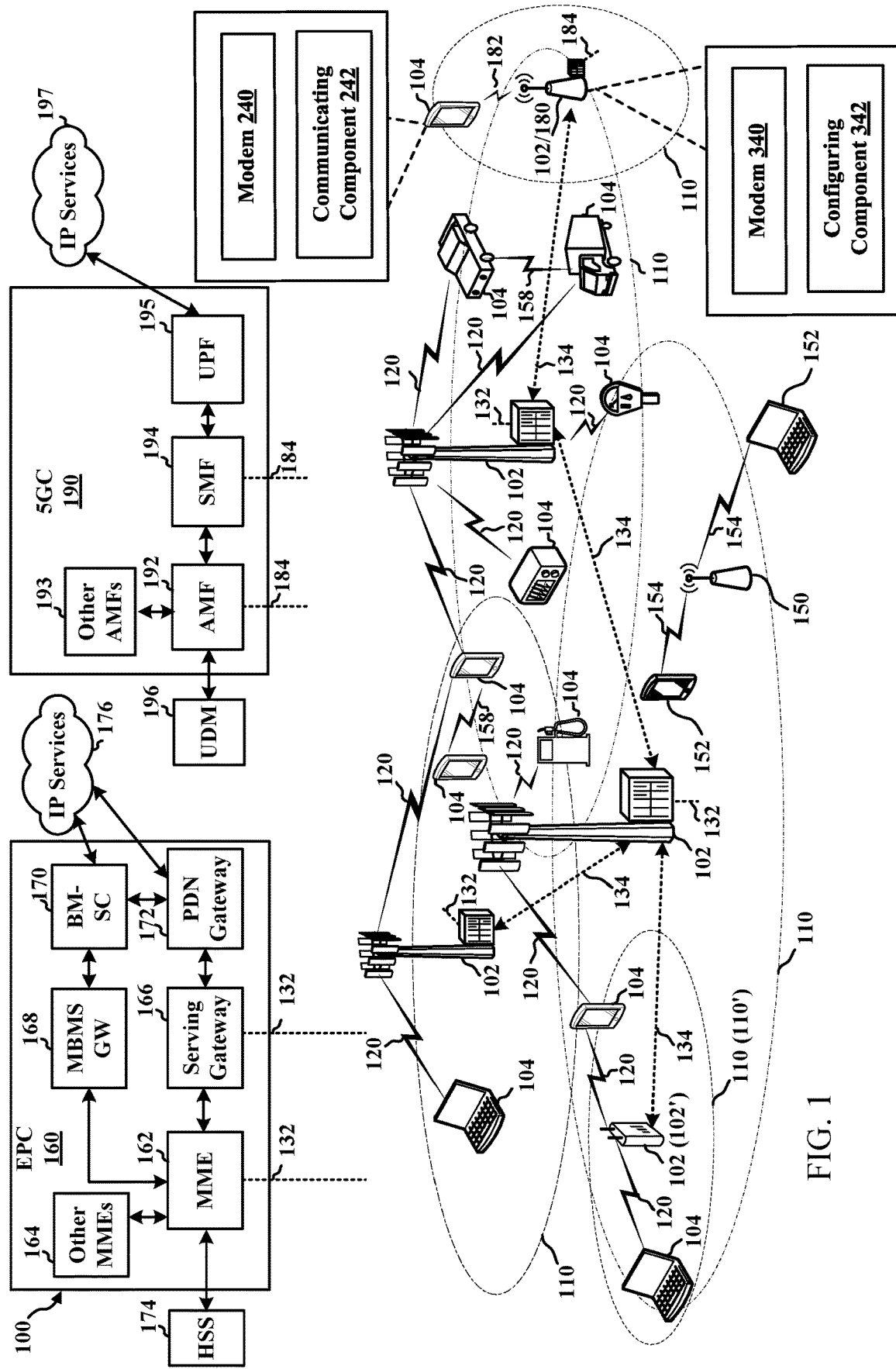
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting repetitions of messages in a two-step random access procedure, though the concepts may be applied to random access procedures with more or less than two steps as well. In two-step random access procedures, a base station can broadcast signals with parameters for establishing a connection with the base station. Such signals may include a synchronization signal block (SSB), system information blocks (SIBs), reference signals (RSs), and/or the like. A user equipment (UE) can receive the broadcast signals and can synchronize with the downlink from the base station, perform system information decoding and measurement, and/or the like. In addition, the UE can determine, based on parameters in the broadcast signals, one or more random access occasions for transmitting random access messages to establish a connection with the base station. When the UE desires to establish a connection with the base station, the UE can transmit a first message of the two-step random access procedure (also referred to herein as "msgA"), which may include a preamble portion and a payload portion (e.g., where the payload portion can include physical uplink shared channel (PUSCH) data), and these portions may be transmitted as separated by a transmission gap in time. The base station can receive the first message (e.g., as the preamble and payload portions) and can transmit a response message to the UE (also referred to herein as "msgB"), where the response message can include a random access response and/or contention resolution information.

As described, for example, there can be a transmission gap defined, and used by the UE, between the preamble portion and the payload portion of the first message. For example, the transmission gap can allow for timing adjustment (TA) for the first message transmission where the TA may be unknown or out of date. Moreover, for example, the transmission gap can allow for different numerology, bandwidth, beam selection, power control scheme, sampling rate for the preamble and payload, compatibility with a listen-before-talk (LBT) scheme (e.g., over a new radio (NR)-U interface), etc. between the preamble portion and the payload portion. In addition, for example, transmission of the preamble portion of the first message can include a guard time between transmissions (e.g., as defined by the wireless communication technology, such as NR, for any time division duplex (TDD) transmission of signals). In this example, the transmission gap may be reduced in view of the added guard time (as compared to not having a guard time). In this regard, in an example, the preamble and payload portions of the first message may be transmitted in different slots (or the same slot).

In addition, in two-step random access procedures, multiple devices performing the two-step random access procedure may share the same PUSCH occasion (PO) for transmitting the payload if their first message transmissions use similar modulation and coding scheme (MCS), waveform, payload size, etc. Resource allocation for PO can be specified relative to a random access channel (RACH) occasion (RO) for transmitting the first message (or at least the preamble portion thereof), by semi-statically or dynamically configured offsets in time and/or frequency. Both separate and shared RO can be configured for two-step random access procedures, such that when a RO is shared between two-step random access procedures and four-step random access procedures, the pool of random access preambles can be partitioned into mutually exclusive subsets, which are used by different random access procedures, in one example.

As described above, msgB in two-step random access procedures is similar to the second message (msg2) and fourth message (msg4) in four-step random access procedures, and thus msgB can perform contention resolution and completion of RACH procedure if msgA transmission is successful. In addition, for example, msgB can be used to request retransmission of msgA payload on granted resources if msgA preamble detection is successful but msgA payload decoding fails. In this regard, reception of msgB can be important or critical to success of the random access procedure.

Aspects described herein relate to enhancing coverage of the second random access message in the two-step random access procedure (msgB). For example, msgB can be repeated in one or more contexts. In an example, a device performing the two-step random access procedure can request that the base station transmit one or more repetitions of msgB for coverage enhancement. For example, the device may indicate a desire to receive one or more repetitions of msgB based on the msgA transmission, such as by indicating a certain format, type, or other content for the msgA transmission. In this example, based on receiving msgA from a device, the base station can determine whether or not to transmit one or more repetitions of msgB to the device, transmission parameters for transmitting the one or more repetitions of msgB to the device, etc. In one example, the one or more repetitions may include one or more repetitions of control data and/or one or more repetitions of corresponding shared channel data. In any case, coverage for msgB can be enhanced in this regard to improve success rate of the random access procedure.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for requesting one or more repetitions of a second random access message, in accordance with aspects described herein. In addition, some nodes may have a modem 340 and configuring component 342 for transmitting one or more repetitions of a second random access message, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can initiate a two-step random access procedure with a base station 102 by transmitting a first random access message (msgA), which can indicate to receive one or more repetitions of a second random access message (msgB). Configuring component 342 can receive the first random access message and determine to transmit the one or more repetitions of the second random access message based on the first random access message. Configuring component 342 can accordingly transmit an initial transmission of the second random access message and one or more repetitions of the second random access message to the UE 104. Communicating component 242 can receive the initial transmission and the one or more repetitions and can combine the transmissions in decoding the second random access message to improve coverage thereof.

Figure 2:
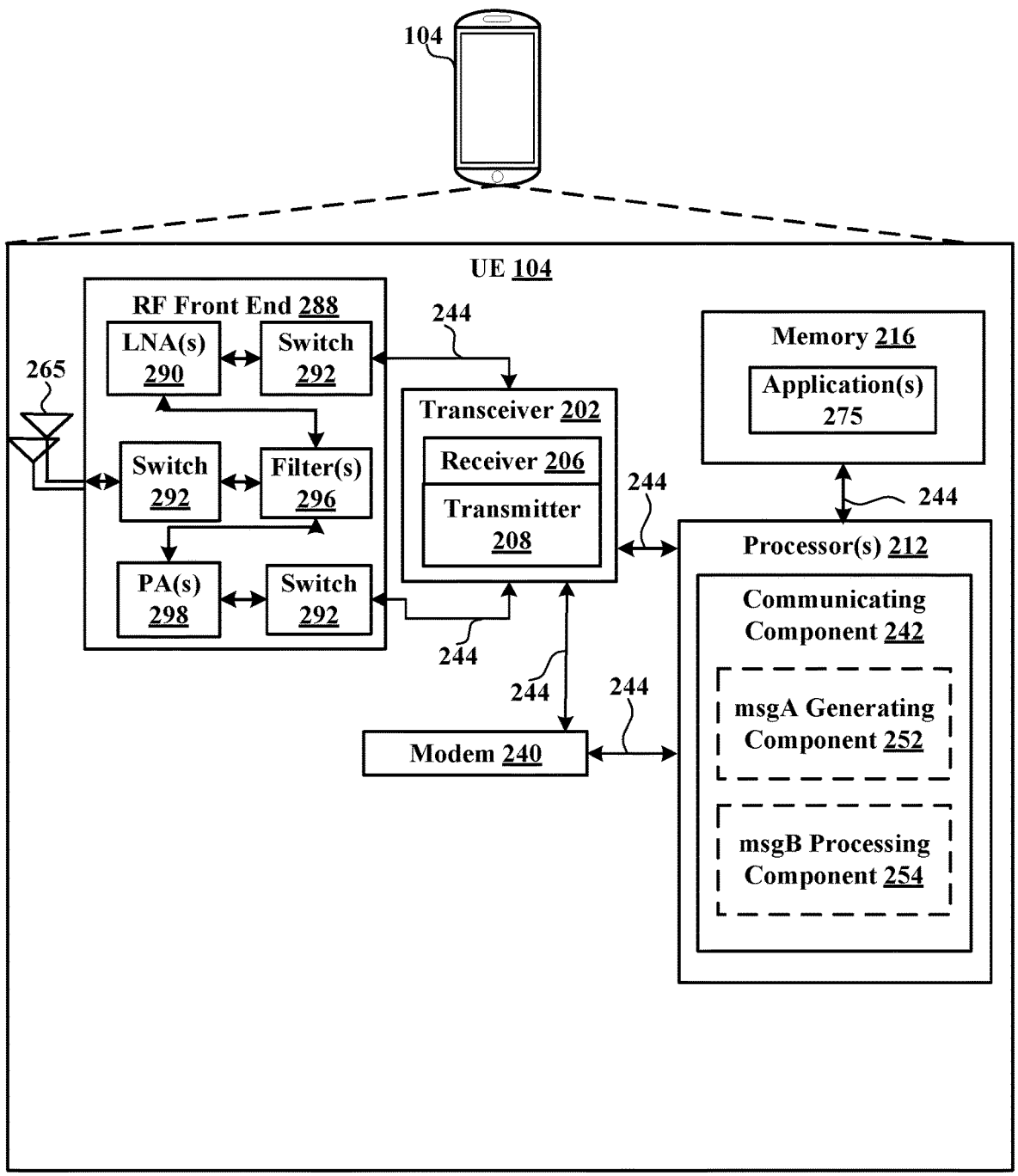
FIG. 2 is a block diagram illustrating an example of a UE, in accordance with various aspects of the present disclosure.
Figure 3:
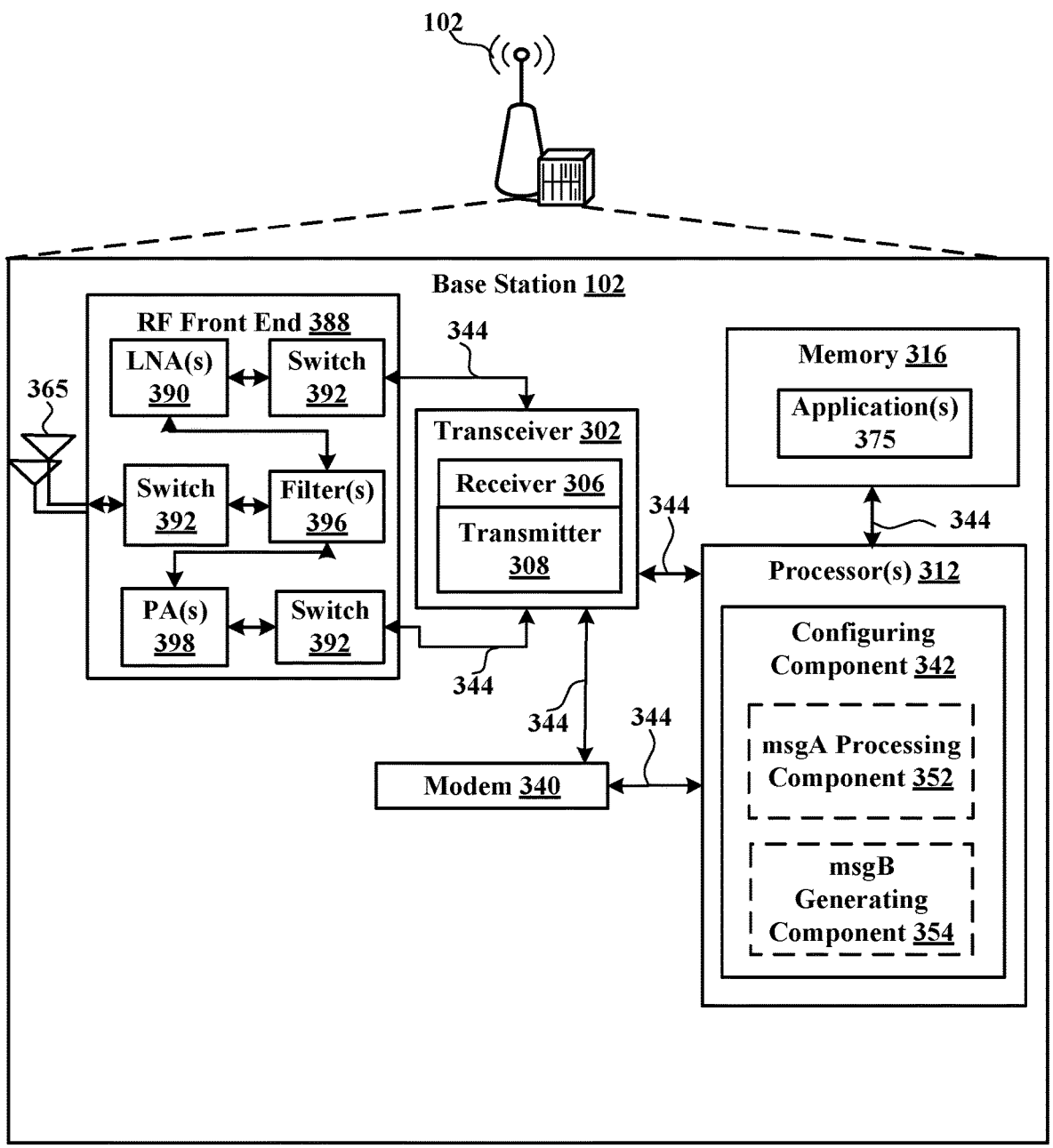
FIG. 3 is a block diagram illustrating an example of a base station, in accordance with various aspects of the present disclosure.
Figure 4:
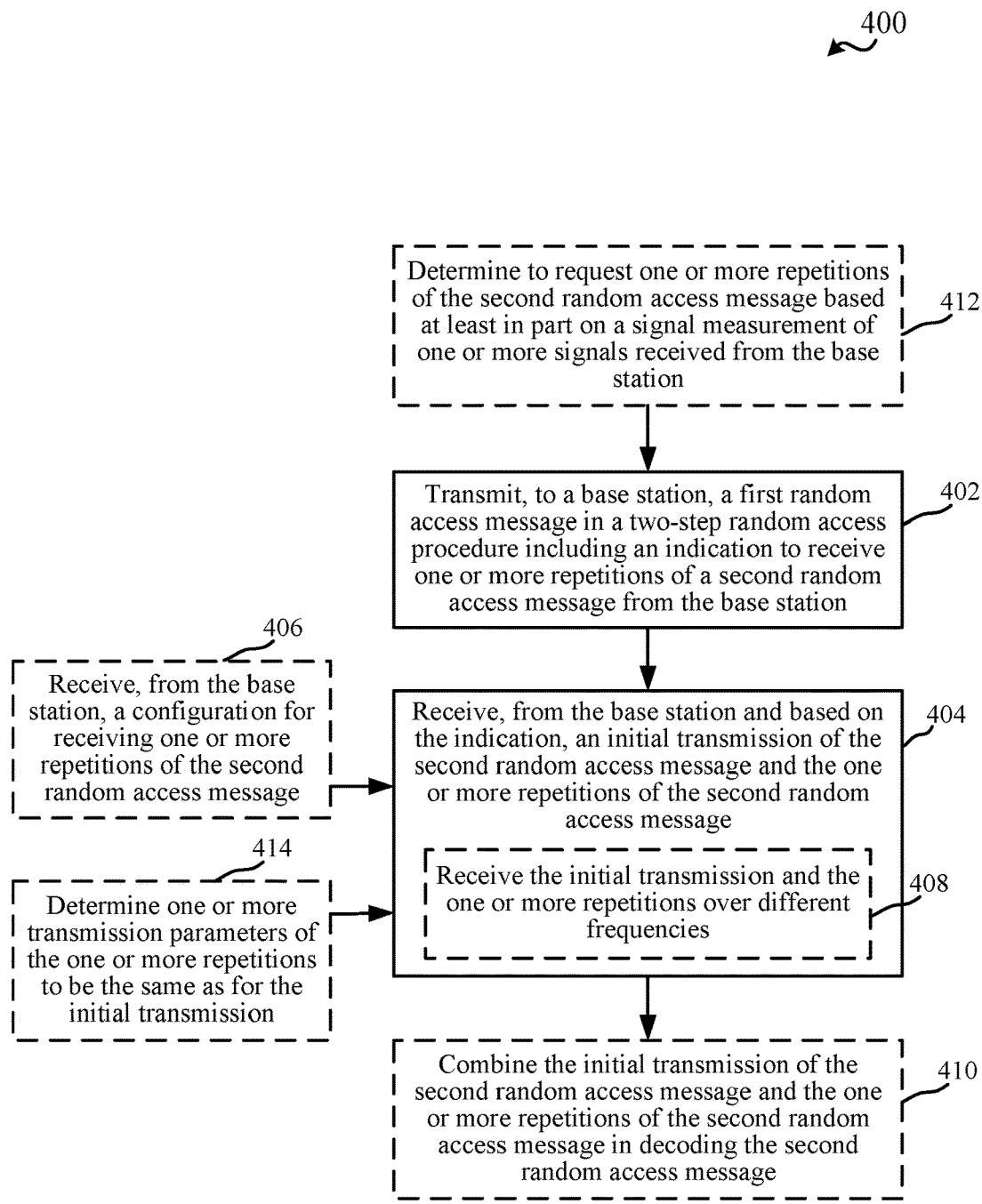
FIG. 4 is a flow chart illustrating an example of a method for requesting one or more repetitions of a second random access message, in accordance with various aspects of the present disclosure.
Figure 5:
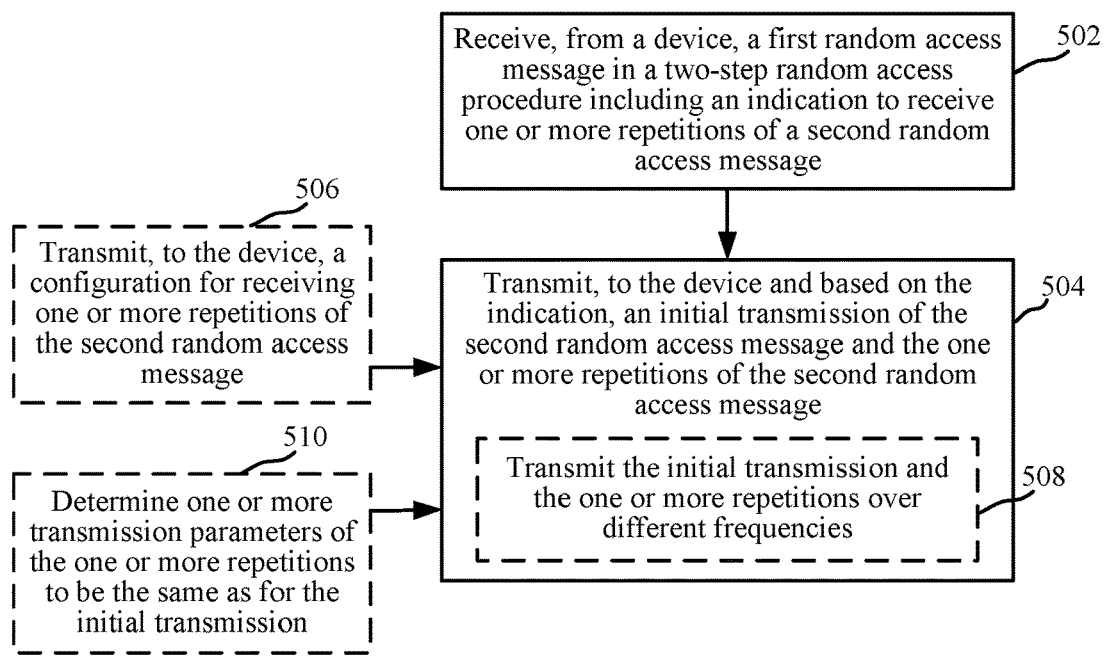
FIG. 5 is a flow chart illustrating an example of a method for transmitting one or more repetitions of a second random access message, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for requesting one or more repetitions of a second random access message, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a msgA generating component 252 for generating a first random access message to transmit in a two-step random access procedure, and a msgB processing component 254 for receiving and decoding a second random access message based on an initial transmission and one or more repetitions thereof, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for transmitting one or more repetitions of a second random access message, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a msgA processing component 352 for receiving and processing a first random access message in a two-step random access procedure, and a msgB generating component 354 for generating a second random access message including an initial transmission and one or more repetitions thereof, in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for requesting one or more repetitions of a second random access message in a two-step random access procedure. In an example, a UE 104 can perform the functions described in method 400 using one or more of the components described in FIGS. 1 and 2.

In method 400, at Block 402, the UE can transmit, to a base station, a first random access message in a two-step random access procedure including an indication to receive one or more repetitions of a second random access message from the base station. In an aspect, msgA generating component 252, e.g., in conjunction with processor(s) 212, memory 216, transceiver 202, communicating component 242, etc., can transmit, to the base station (e.g., base station 102), the first random access message in the two-step random access procedure including the indication to receive one or more repetitions of the second random access message from the base station. As described, msgA generating component 252 can generate and transmit the first random access message including a preamble portion (e.g., a RACH preamble) and a payload portion (e.g., PUSCH) for transmitting in a random access occasion defined and/or configured by the base station 102. For example, msgA generating component 252 can include the indication to receive one or more repetitions of the second random access message as an explicit indication in the first random access message. For example, the explicit indication can include a specific parameter value or field in the first random access message to request the one or more repetitions, an indication of a number of repetitions to receive, or the like.

In another example, msgA generating component 252 can include the indication to receive one or more repetitions of the second random access message as an implicit indication in the first random access message. In this example, msgA generating component 252 can select a type for the first random access message, a format for the first random access message (e.g., a longer PRACH format), contents of the first random access message, etc. to indicate the request for one or more repetitions. In one specific example, msgA generating component 252 can select a random access preamble for the first message or a random access occasion for transmitting the first message, where the random access preamble or the random access occasion may indicate the request for the one or more repetitions of the second random access message. In yet another example, msgA generating component 252 can generate a payload portion (e.g., PUSCH portion) of the first message to indicate to receive the one or more repetitions, which may include an explicit indication in the payload portion, or an implicit indication in the payload portion, such as a number of repetitions of the payload portion transmitted to the base station 102 (e.g., to indicate a reciprocal number of repetitions desired for the second random access message), or the like.

In method 400, at Block 404, the UE can receive, from the base station and based on the indication, an initial transmission of the second random access message and the one or more repetitions of the second random access message. In an aspect, msgB processing component 254, e.g., in conjunction with processor(s) 212, memory 216, transceiver 202, communicating component 242, etc., can receive, from the base station and based on the indication, the initial transmission of the second random access message and the one or more repetitions of the second random access message. In an example, msgB processing component 254 can determine to receive the one or more repetitions or can otherwise detect the one or more repetitions based on the indication transmitted to the base station (e.g., at Block 402). In an example, msgB processing component 254 can determine a number of repetitions to receive, resources for receiving the repetitions, etc. based, at least in part, on the indication as a selected first random access message type or format, message contents, preamble, etc. For example, the base station 102 can transmit, and msgB processing component 254 can receive and process, the one or more repetitions of the second random access message based on the indication indicating a request for one or more repetitions, a number of repetitions requested, etc. In addition, for example, the base station 102 can transmit, and msgB processing component 254 can receive and process, the one or more repetitions of the second random access message for a length of a specific portion of a random access response (RAR) window, such that another portion of the RAR window can be used for other steps of the two-step random access procedure. In one example, msgB processing component 254 can determine parameters related to receiving the one or more repetitions of the second random access message based on the indication transmitted at Block 402.

In method 400, optionally at Block 406, the UE can receive, from the base station, a configuration for receiving one or more repetitions of the second random access message. In an aspect, msgB processing component 254, e.g., in conjunction with processor(s) 212, memory 216, transceiver 202, communicating component 242, etc., can receive, from the base station, the configuration for receiving one or more repetitions of the second random access message. For example, the configuration may indicate parameters for transmitting, by the base station 102, the one or more repetitions (e.g., a number of repetitions, a period between repetitions or other timing-related information, a frequency over which the one or more repetitions are transmitted, etc.). In another example, the configuration may indicate a relationship between the second random access message repetitions (or the parameters for transmitting the one or more repetitions) and the first random access message indication (e.g., as transmitted at Block 402) to receive the one or more second random access message repetitions. For example, the configuration may indicate the relationship between the second random access message repetitions and one or more features of the first random access message, such as a type, PRACH format, PUSCH repetition, etc. of the first random access message. In one example, base station 102 can transmit the configuration, and msgB processing component 254 can receive the configuration, in remaining minimum system information (RMSI) or other system information broadcast signaling. In any case, in this example, msgA generating component 252 can generate and transmit a first random access message based on one or more parameters, and msgB processing component 254 can accordingly determine a number of repetitions to receive, resources over which to receive the repetitions, or other parameters related to receiving repetitions of the second random access message based on the one or more parameters of the first random access message.

In yet another example, the relationship and/or parameters described above (or a portion thereof) can additionally or alternatively be specified in a radio access technology standard and/or accordingly stored, coded, etc. in memory 216 of the UE 104. In this example, msgB processing component 254 can determine such information from the memory 216 for use in determining parameters related to receiving the one or more repetitions in Block 404, determining the indication to transmit in Block 402, etc.

In receiving the initial transmission and the one or more repetitions at Block 404, optionally at Block 408, the UE can receive the initial transmission and the one or more repetitions over different frequencies. In an aspect, msgB processing component 254, e.g., in conjunction with processor(s) 212, memory 216, transceiver 202, communicating component 242, etc., can receive and process the initial transmission and the one or more repetitions over different frequencies. In an example, the frequency of the one or more repetitions and/or the frequency of the initial transmission (and/or a difference between the frequency of the one or more repetitions and/or the frequency of the initial transmission, etc.) can be indicated in the relationship and/or parameters described above (e.g., as received in the configuration or stored in memory 216). The different frequencies can correspond to different frequency resources within symbol or slot, such as different sets of subcarriers, different frequency channels, different resource blocks or resource elements, etc. For example, the base station 102 can transmit the one or more repetitions over different frequencies in a corresponding slot to implement frequency hopping, as described further herein. In this example, msgB processing component 254 can determine the frequency over which to receive the initial transmission and can determine the different frequency over which to receive the one or more repetitions.

In method 400, optionally at Block 410, the UE can combine the initial transmission of the second random access message and the one or more repetitions of the second random access message in decoding the second random access message. In an aspect, msgB processing component 254, e.g., in conjunction with processor(s) 212, memory 216, transceiver 202, communicating component 242, etc., can combine the initial transmission of the second random access message and the one or more repetitions of the second random access message in decoding the second random access message. For example, msgB processing component 254 can combine, using soft combining, the signal of the initial transmission and signal(s) of the one or more repetitions into a single signal at the receiver for decoding and processing the second random access message.

In method 400, optionally at Block 412, the UE can determine to request one or more repetitions of the second random access message based at least in part on a signal measurement of one or more signals received from the base station. In an aspect, msgA generating component 252, e.g., in conjunction with processor(s) 212, memory 216, transceiver 202, communicating component 242, etc., can determine to request one or more repetitions of the second random access message based at least in part on the signal measurement of one or more signals received from the base station. For example, msgA generating component 252 can then determine to transmit the first random access message to indicate to receive the one or more repetitions based on the signal measurement and determining to request the one or more repetitions of the second random access message. For example, msgA generating component 252 can receive a synchronization signal block (SSB) from the base station 102, and can measure a signal measurement of the SSB, such as a reference signal received power (RSRP), reference signal received quality (RSRQ), received signal strength indicator (RSSI), signal-to-noise ratio (SNR), etc. Where the signal measurement does not achieve a threshold, for example, msgA generating component 252 can determine to request the one or more repetitions. In one example, based on the signal measurement, msgA generating component 252 may determine a number of repetitions to request. In any case, as described, msgA generating component 252 can indicate to receive the one or more repetitions (or the number of repetitions to receive) in the first random access message transmission.

In method 400, optionally at Block 414, the UE can determine one or more transmission parameters of the one or more repetitions to be the same as for the initial transmission. In an aspect, msgB processing component 254, e.g., in conjunction with processor(s) 212, memory 216, transceiver 202, communicating component 242, etc., can determine the one or more transmission parameters of the one or more repetitions to be the same as for the initial transmission. For example, msgB processing component 254 can determine the one or more transmission parameters, such as MCS, resource block (RB), symbol index within a slot, etc. of the one or more repetitions to be the same as for the initial transmission. For example, a symbol may correspond to an orthogonal frequency division multiplexing (OFDM) symbol, a single-carrier frequency division multiplexing (SC-FDM) symbol, etc. and/or a slot may include multiple consecutive symbols in time. In one example, this may be indicted in the configuration received in Block 406 or otherwise stored in memory 216, etc., as described. In this example, msgB processing component 254 can receive the one or more repetitions based on the transmission parameters.

In a specific example, msgB processing component 254 can receive the one or more repetitions in multiple slots (e.g., in aggregated slots), such that the initial transmission can be received in a first slot, one repetition can be received in a second slot in the aggregated slots that is subsequent in time (adjacent in time in one example) to the first slot, another repetition (where present) can be received in a third slot in the aggregated slots that is subsequent in time (adjacent in time in one example) to the second slot, etc. For example, in the aggregated slots for msgB physical downlink control channel (PDCCH) repetition, the corresponding PDCCH candidates with the same aggregation and location (and/or index) can be paired together and msgB processing component 254 can perform soft combination of them, before decoding and checking cyclic redundancy check (CRC), as described. In an example, during physical downlink shared channel (PDSCH) repetitions, the same time and frequency resource allocation, e.g., symbols and RBs, and other transmission parameters such as MCS (according to the scheduling PDCCH) may be applied by the msgB processing component 254 for receiving the repeated transmissions. Additionally, in an example, a configured or defined change in frequency resource allocation may be applied for different repetitions of msgB PDSCH, such to apply a hopping pattern for the PDSCH to hop frequency over multiple slots, as described above. The number of repetitions for msgB PDSCH and msgB PDCCH may be different. An example is shown in FIG. 6.

Figure 6:
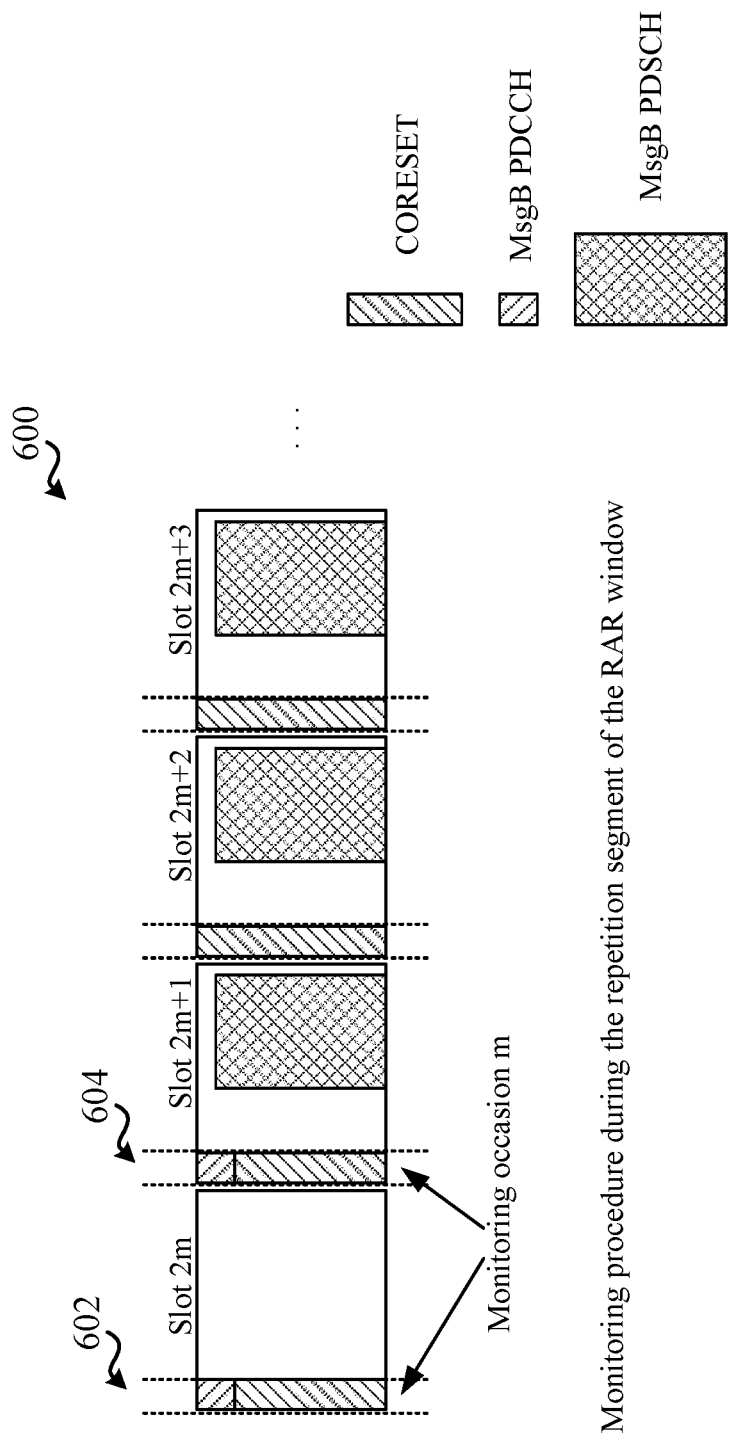
FIG. 6 illustrates an example of a timeline for receiving one or more repetitions of a second random access message, in accordance with various aspects of the present disclosure.

FIG. 6 illustrates an example of a timeline 600 for receiving an initial transmission of a second random access message and one or more repetitions of the second random access message in multiple subsequent slots. In this example, and other examples described herein, a slot can include a number of symbols (e.g., OFDM symbols) that can be contiguous in time. The first random access message and/or the second random access message and/or one or more repetitions thereof can each be transmitted over a symbol or one or more consecutive symbols within a slot. For example, resources over corresponding channels (e.g., PUCCH, PUSCH, PDCCH, PDSCH) can be defined over one or more symbols within a slot and over one or more portions of frequency within the one or more symbols (e.g., one or more subcarriers, resource elements, resource blocks, etc.).

In timeline 600, an initial transmission of the second random access message is transmitted at 602 in slot 2 m, and includes a control resource set (CORESET) and PDCCH, where the PDCCH can refer to a PDSCH transmitted in the next slot 2 m+1. A repetition of the CORESET and PDCCH of the second random access message is transmitted at 604 in slot 2 m+1. A repetition of PDSCH transmitted in the next slot 2 m+2 and slot 2 m+3. The time and frequency parameters for the PDSCH in each slot can be determined to be the same, as described above, or the frequency may change within the each slot to implement a hopping pattern, etc. In any case, msgB processing component 254 can determine the parameters for receiving, in response to a transmitted first random access message, the initial transmission and one or more repetitions of the second random access message, as described above. Moreover, as described in an example, the repetitions can continue for a duration of a RAR window.

FIG. 5 illustrates a flow chart of an example of a method 500 for transmitting one or more repetitions of a second random access message in a two-step random access procedure. In an example, a base station 102 can perform the functions described in method 500 using one or more of the components described in FIGS. 1 and 3.

In method 500, at Block 502, the base station can receive, from a device, a first random access message in a two-step random access procedure including an indication to receive one or more repetitions of a second random access message. In an aspect, msgA processing component 352, e.g., in conjunction with processor(s) 312, memory 316, transceiver 302, configuring component 342, etc., can receive, from the device (e.g., UE 104), the first random access message in the two-step random access procedure including the indication to receive one or more repetitions of the second random access message. As described, the first random access message may include a preamble portion and a payload portion, and/or an explicit or implicit indicator to receive the one or more repetitions of the second random access message. For example, the first random access message may indicate to receive the one or more repetitions based on a PRACH format of the preamble portion (e.g., a longer PRACH format can be used to request repetitions), a type or selection of preamble used, a selection of a random access occasion, an indication in the preamble or payload portion to receive one or more repetitions, one or more repetitions of the payload portion included in transmitting the first random access message, etc.

In method 500, at Block 504, the base station can transmit, to the device and based on the indication, an initial transmission of the second random access message and the one or more repetitions of the second random access message. In an aspect, msgB generating component 354, e.g., in conjunction with processor(s) 312, memory 316, transceiver 302, configuring component 342, etc., can generate and transmit, to the device and based on the indication, the initial transmission of the second random access message and the one or more repetitions of the second random access message. For example, msgB generating component 354 can determine a number of repetitions to generate and transmit based on detecting the indication by the first random access message. For example, msgB generating component 354 can determine the number of repetitions based on detecting an explicit indication in the first random access message, a preamble or random access occasion selected for the first random access message, a number of repetitions of a payload portion of the first random access message, etc., as described. In addition, for example, msgB generating component 354 can generate the one or more repetitions based on one or more parameters for transmitting the one or more repetitions and/or a relationship defined between the indication in the first random access message and the one or more repetitions of the second random access message, as described above.

In one example, in method 500, optionally at Block 506, the base station can transmit, to the device, a configuration for receiving one or more repetitions of the second random access message. In an aspect, configuring component 342, e.g., in conjunction with processor(s) 312, memory 316, transceiver 302, etc., can transmit, to the device, the configuration for receiving the one or more repetitions of the second random access message. As described above, for example, the configuration can indicate parameters for receiving the one or more repetitions (e.g., a number of repetitions, a period between repetitions or other timing-related information, a frequency over which the one or more repetitions are transmitted, etc.). In one example, configuring component 342 can determine the parameters based on the first random access message (e.g., based on message contents, a signal metric measured of the signal that includes the message, etc.) or based on other considerations (e.g., a capability of the UE 104, parameters stored in memory 316 of the base station 102, etc.). In another example, the configuration may indicate a relationship between the second random access message repetitions (or the parameters for transmitting the one or more repetitions) and the first random access message indication to receive the one or more second random access message repetitions. The UE 104 can use this configuration to determine parameters for receiving the one or more second random access message repetitions, as described. For example, the configuration may indicate the relationship between the second random access message repetitions and a type, PRACH format, PUSCH repetition, etc. of the first random access message. In one example, configuring component 342 can transmit the configuration in RMSI or other system information broadcast signaling.

In yet another example, the relationship and/or parameters described above (or a portion thereof) can additionally or alternatively be specified in a radio access technology standard and/or accordingly specified in memory 316 of the base station 102. In either example, msgB generating component 354 can determine such information from the configuration or from memory 316 for use in generating the one or more repetitions based on the corresponding parameters.

In transmitting the initial transmission and the one or more repetitions at Block 504, optionally at Block 508, the base station can transmit the initial transmission and the one or more repetitions over different frequencies. In an aspect, msgB generating component 354, e.g., in conjunction with processor(s) 312, memory 316, transceiver 302, configuring component 342, etc., can transmit the initial transmission and the one or more repetitions over different frequencies. In an example, the frequency of the one or more repetitions and/or the frequency of the initial transmission (and/or a difference between the frequency of the one or more repetitions and/or the frequency of the initial transmission, etc.) can be indicated in the relationship and/or parameters described above (e.g., as transmitted in the configuration or stored in memory 316). As described, for example, the different frequencies can correspond to different frequency resources within symbol or slot, such as different sets of subcarriers, different frequency channels, different resource blocks or resource elements, etc. For example, msgB generating component 354 can transmit the one or more repetitions over different frequencies in a corresponding slot to implement frequency hopping, as described above.

In method 500, optionally at Block 510, the base station can determine one or more transmission parameters of the one or more repetitions to be the same as for the initial transmission. In an aspect, msgB generating component 354, e.g., in conjunction with processor(s) 312, memory 316, transceiver 302, configuring component 342, etc., can determine one or more transmission parameters of the one or more repetitions to be the same as for the initial transmission. For example, msgB generating component 354 can determine the one or more transmission parameters, such as MCS, RB, symbol index within a slot, etc. of the one or more repetitions to be the same as for the initial transmission. In one example, msgB generating component 354 can indicate the same parameters in the configuration transmitted in Block 510 or otherwise stored in memory 316, etc., as described. In this example, msgB generating component 354 can generate and transmit the one or more repetitions based on the transmission parameters. In other examples, msgB generating component 254 can determine and/or indicate different parameters for transmitting each of the one or more repetitions (e.g., different MCS, RB, symbol index within a slot, etc.).

Figure 7:
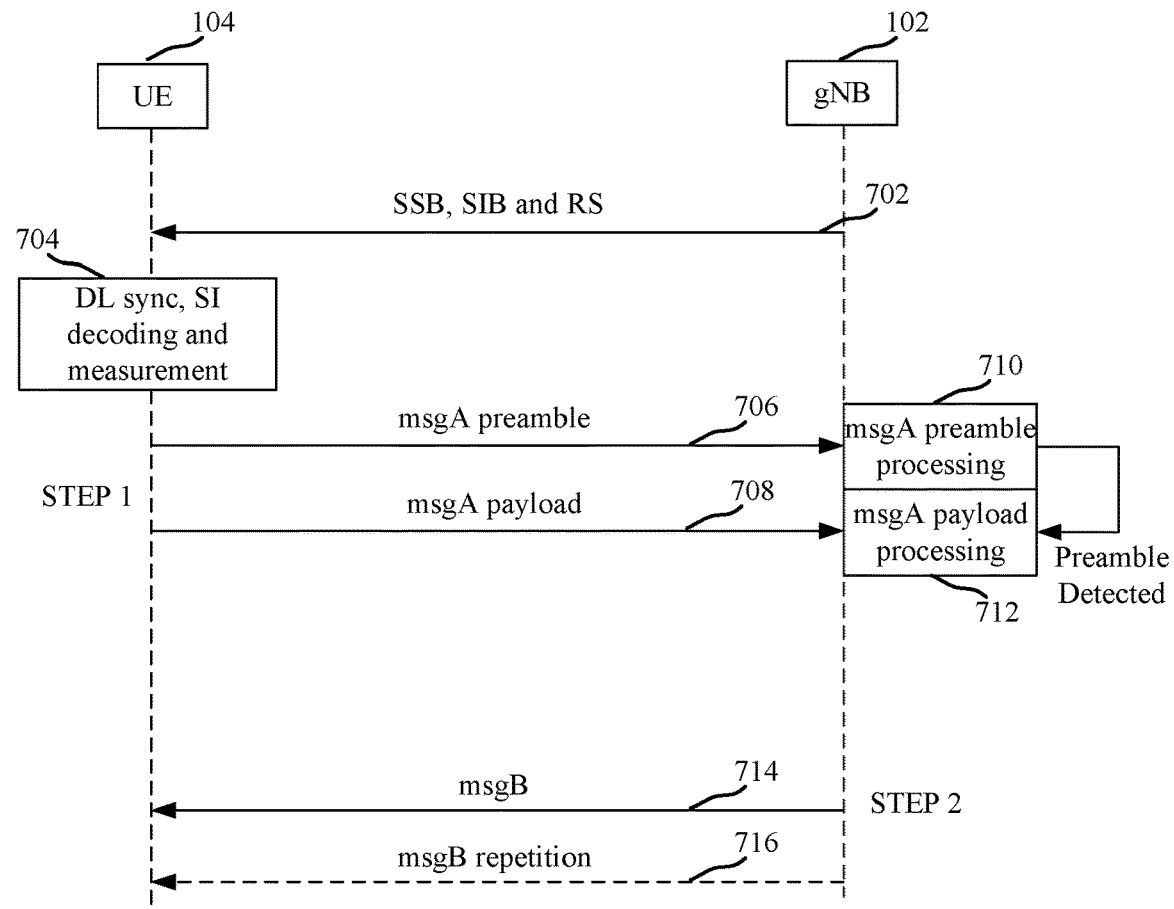
FIG. 7 illustrates an example of a system for transmitting random access messages, in accordance with various aspects of the present disclosure.

FIG. 7 illustrates an example of a system 700 for transmitting random access messages in a two-step random access procedure. Before starting two-step RACH, UE receives and processes SSB/SIB/RS from the serving gNB. For example, system 700 includes a UE 104 that can transmit random access messages to a gNB 102 for requesting connection establishment therewith. In this example, gNB 102 can transmit SSB, SIB, and RS 702. The UE 104 can perform downlink synchronization, system information decoding, and/or measurements at 704. Based on the data in UE's 104 buffer, a UE-identifier and the system information, the UE 104 can generate a message A (msgA) and transmit it to gNB on a RACH occasion (RO) associated with a suitable SSB beam. The UE 104 can transmit msgA as a preamble portion 706 and a payload portion 708. In one example, as described above, msgA can be generated to indicate receiving repetitions of msgB (e.g., where RSRP of SSB is determined to be below a threshold). After possibly receiving and processing msgA preamble/payload, gNB 102 can proceed as follows: if both preamble detection and payload decoding are successful at 710 and 712, gNB 102 can generate a message B (msgB) and transmit it to the two-step RACH UE 104 at 714, in which case, msgB can include a contention resolution ID or ACK for msgA payload; if preamble detection is successful at 710 but payload decoding fails at 712, gNB 102 can also generate a msgB and transmit it to the UE 104, in which case, msgB can include a random access preamble index (RAPID) or an ACK for msgA preamble, as well as a DCI for the retransmission of msgA, where the DCI can order both preamble and payload to be re-transmitted, or just request payload to be re-transmitted; or if neither preamble nor payload is detected at 710 and 712, gNB does not transmit msgB 714.

In this example, where msgB is transmitted at 714, if the gNB 102 determines that msgA indicates to receive one or more repetitions of msgB, gNB 102 can also transmit one or more repetitions of msgB at 716 in accordance with aspects described above.

Figure 8:
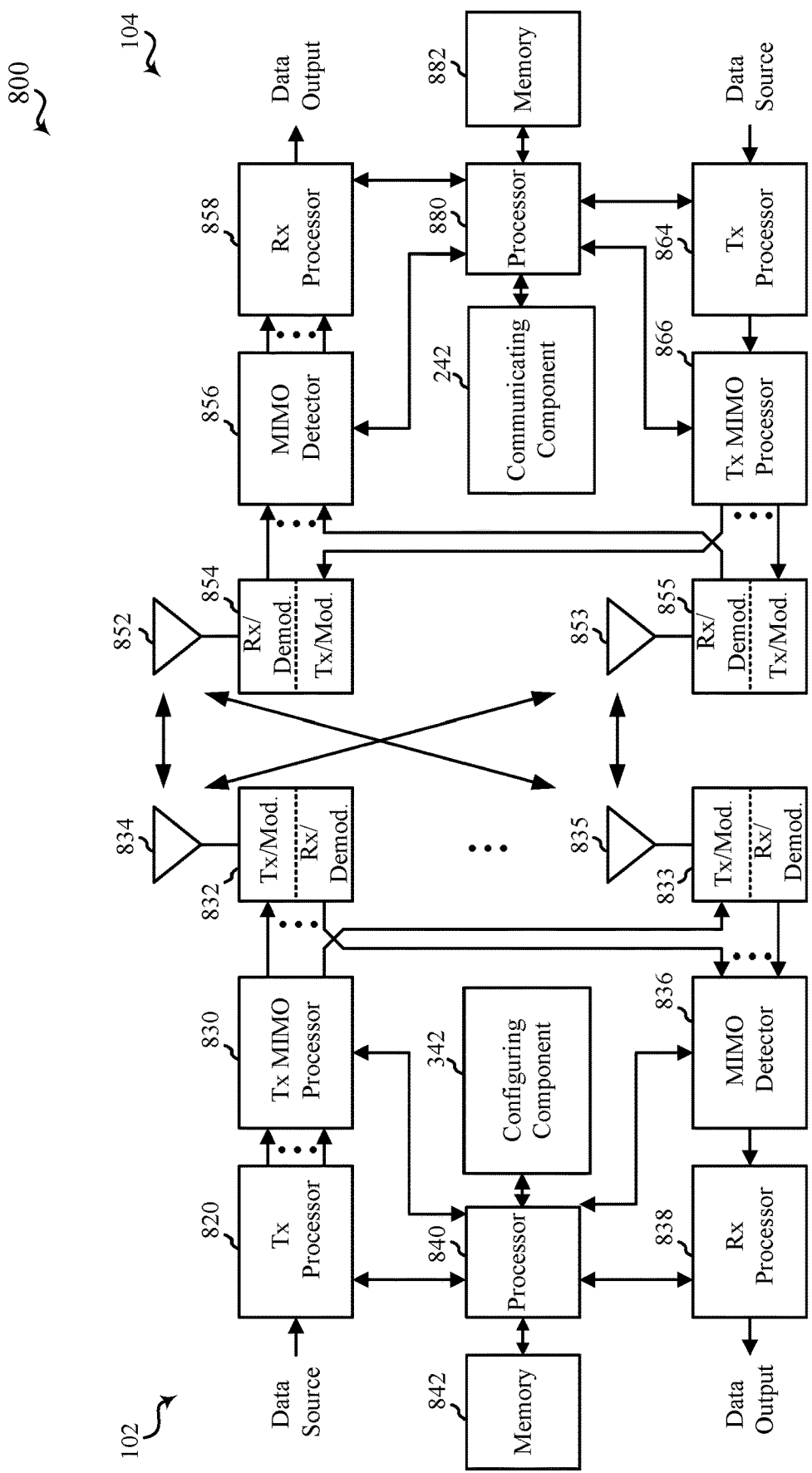
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including transmitting, to a base station, a first random access message in a two-step random access procedure, wherein the first random access message includes an indication to receive one or more repetitions of a second random access message from the base station, and receiving, from the base station and based on the indication, an initial transmission of the second random access message and the one or more repetitions of the second random access message.

In Aspect 2, the method of Aspect 1 includes wherein the indication includes a random access preamble used in the first random access message.

In Aspect 3, the method of any of Aspects 1 or 2 include wherein the indication includes a format of the first random access message.

In Aspect 4, the method of any of Aspects 1 to 3 include determining to include the indication in the first random access message based at least in part on a received signal strength measurement of a SSB from the base station.

In Aspect 5, the method of any of Aspects 1 to 4 include wherein the one or more repetitions of the second random access message are specific to a length of at least a portion of a random access response window.

In Aspect 6, the method of any of Aspects 1 to 5 include determining, from a configuration, the indication to use for receiving the one or more repetitions of the second random access message.

In Aspect 7, the method of Aspect 6 includes receiving the configuration in RMSI signaled by the base station.

In Aspect 8, the method of any of Aspects 1 to 7 include combining the initial transmission of the second random access message and the one or more repetitions of the second random access message into a single message, and decoding the single message.

In Aspect 9, the method of any of Aspects 1 to 8 include determining one or more transmission parameters of the one or more repetitions of the second random access message to be the same as for the initial transmission of the second random access message.

In Aspect 10, the method of any of Aspects 1 to 9 include wherein the one or more repetitions of the second random access message are received over a different frequency than the initial transmission of the second random access message.

In Aspect 11, the method of any of Aspects 1 to 10 include wherein the second random access message includes a control channel and a data channel, and wherein the one or more repetitions of the second random access message comprises a first number of repetitions of the control channel and a second number of repetitions of the data channel.

Aspect 12 is a method for wireless communication including receiving, from a device, a first random access message in a two-step random access procedure, wherein the first random access message includes an indication to receive one or more repetitions of a second random access message, and transmitting, to the device and based on the indication, an initial transmission of the second random access message and the one or more repetitions of the second random access message.

In Aspect 13, the method of Aspect 12 includes wherein the indication includes a random access preamble used in the first random access message.

In Aspect 14, the method of any of Aspects 12 or 13 include wherein the indication includes a format of the first random access message.

In Aspect 15, the method of any of Aspects 12 to 14 include wherein the one or more repetitions of the second random access message are specific to a length of at least a portion of a random access response window.

In Aspect 16, the method of any of Aspects 12 to 15 include transmitting, to the device, a configuration specifying the indication to use for receiving the one or more repetitions of the second random access message.

In Aspect 17, the method of Aspect 16 includes wherein transmitting the configuration comprises transmitting the configuration in RMSI.

In Aspect 18, the method of any of Aspects 12 to 17 include determining one or more transmission parameters of the one or more repetitions of the second random access message to be the same as for the initial transmission of the second random access message.

In Aspect 19, the method of any of Aspects 12 to 18 include wherein transmitting the initial transmission and the one or more repetitions comprises transmitting the one or more repetitions of the second random access message over a different frequency than the initial transmission of the second random access message.

In Aspect 20, the method of any of Aspects 12 to 19 include wherein the second random access message includes a control channel and a data channel, and wherein the one or more repetitions of the second random access message comprises a first number of repetitions of the control channel and a second number of repetitions of the data channel.

Aspect 21 is an apparatus for wireless communication including a transceiver, a memory configured to store instructions, and one or more processors communicatively coupled with the memory and the transceiver, wherein the one or more processors are configured to perform one or more of the methods of any of Aspects 1 to 20.

Aspect 22 is an apparatus for wireless communication including means for performing one or more of the methods of any of Aspects 1 to 20.

Aspect 23 is a computer-readable medium including code executable by one or more processors for wireless communications, the code including code for performing one or more of the methods of any of Aspects 1 to 20.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    transmitting, to a base station, a first random access message in a two-step random access procedure, wherein the first random access message includes an indication to receive one or more repetitions of a second random access message from the base station;
    receiving, from the base station and based on the indication, an initial transmission of the second random access message and the one or more repetitions of the second random access message;
    combining the initial transmission of the second random access message and the one or more repetitions of the second random access message into a single message; and
    decoding the single message.

2. The method of claim 1, wherein the indication includes a random access preamble used in the first random access message.

3. The method of claim 1, wherein the indication includes a format of the first random access message.

4. The method of claim 1, further comprising determining to include the indication in the first random access message based at least in part on a received signal strength measurement of a synchronization signal block (SSB) from the base station.

5. The method of claim 1, wherein the one or more repetitions of the second random access message are specific to a length of at least a portion of a random access response window.

6. The method of claim 1, further comprising determining, from a configuration, the indication to use for receiving the one or more repetitions of the second random access message.

7. The method of claim 6, further comprising receiving the configuration in remaining minimum system information (RMSI) signaled by the base station.

8. The method of claim 1, further comprising determining one or more transmission parameters of the one or more repetitions of the second random access message to be the same as for the initial transmission of the second random access message.

9. The method of claim 8, wherein the one or more transmission parameters include a modulation and coding scheme (MCS), one or more resource blocks (RBs), or a symbol index within a slot for the one or more repetitions of the second random access message.

10. The method of claim 1, wherein the one or more repetitions of the second random access message are received over a different frequency than the initial transmission of the second random access message.

11. The method of claim 1, wherein the second random access message includes a control channel and a data channel, and wherein the one or more repetitions of the second random access message comprises a first number of repetitions of the control channel and a second number of repetitions of the data channel.

12. A method for wireless communication, comprising:
    receiving, from a device, a first random access message in a two-step random access procedure, wherein the first random access message includes an indication to receive one or more repetitions of a second random access message; and
    transmitting, to the device and based on the indication, an initial transmission of the second random access message and the one or more repetitions of the second random access message,
    wherein the second random access message includes a control channel and a data channel, and wherein the one or more repetitions of the second random access message comprises a first number of repetitions of the control channel and a second number of repetitions of the data channel.

13. The method of claim 12, wherein the indication includes a random access preamble used in the first random access message.

14. The method of claim 12, wherein the indication includes a format of the first random access message.

15. The method of claim 12, wherein the one or more repetitions of the second random access message are specific to a length of at least a portion of a random access response window.

16. The method of claim 12, further comprising transmitting, to the device, a configuration specifying the indication to use for receiving the one or more repetitions of the second random access message.

17. The method of claim 16, wherein transmitting the configuration comprises transmitting the configuration in remaining minimum system information (RMSI).

18. The method of claim 12, further comprising determining one or more transmission parameters of the one or more repetitions of the second random access message to be the same as for the initial transmission of the second random access message.

19. The method of claim 18, wherein the one or more transmission parameters include a modulation and coding scheme (MCS), one or more resource blocks (RBs), or a symbol index within a slot for the one or more repetitions of the second random access message.

20. The method of claim 12, wherein transmitting the initial transmission and the one or more repetitions comprises transmitting the one or more repetitions of the second random access message over a different frequency than the initial transmission of the second random access message.

21. An apparatus for wireless communication, comprising:
a transceiver;
a memory configured to store instructions; and
one or more processors communicatively coupled with the memory and the transceiver, wherein the one or more processors are configured to:
transmit, to a base station, a first random access message in a two-step random access procedure, wherein the first random access message includes an indication to receive one or more repetitions of a second random access message from the base station;
receive, from the base station and based on the indication, an initial transmission of the second random access message and the one or more repetitions of the second random access message;
combine the initial transmission of the second random access message and the one or more repetitions of the second random access message into a single message; and
decode the single message.

22. The apparatus of claim 21, wherein the indication includes a random access preamble used in the first random access message.

23. The apparatus of claim 21, wherein the indication includes a format of the first random access message.

24. The apparatus of claim 21, wherein the one or more processors are further configured to determine to include the indication in the first random access message based at least in part on a received signal strength measurement of a synchronization signal block (SSB) from the base station.

25. The apparatus of claim 21, wherein the one or more repetitions of the second random access message are specific to a length of at least a portion of a random access response window.

26. The apparatus of claim 21, wherein the one or more processors are further configured to determine, from a configuration, the indication to use for receiving the one or more repetitions of the second random access message.

27. An apparatus for wireless communication, comprising:
a transceiver;
a memory configured to store instructions; and
one or more processors communicatively coupled with the memory and the transceiver, wherein the one or more processors are configured to:
receive, from a device, a first random access message in a two-step random access procedure, wherein the first random access message includes an indication to receive one or more repetitions of a second random access message; and
transmit, to the device and based on the indication, an initial transmission of the second random access message and the one or more repetitions of the second random access message;
wherein the second random access message includes a control channel and a data channel, and
wherein the one or more repetitions of the second random access message comprises a first number of repetitions of the control channel and a second number of repetitions of the data channel.

28. The apparatus of claim 27, wherein the indication includes a random access preamble used in the first random access message.

* * * * *